United States Patent
Han et al.

(10) Patent No.: US 12,021,228 B2
(45) Date of Patent: Jun. 25, 2024

(54) METHOD OF PRODUCING POSITIVE ELECTRODE MATERIAL FOR SECONDARY BATTERY

(71) Applicant: LG Energy Solution, Ltd., Seoul (KR)

(72) Inventors: Gi Beom Han, Daejeon (KR); Wang Mo Jung, Daejeon (KR); Sang Wook Lee, Daejeon (KR); Hak Yoon Kim, Daejeon (KR); So Ra Baek, Daejeon (KR); Jung Min Han, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 0 days.

(21) Appl. No.: 17/780,128

(22) PCT Filed: Dec. 4, 2020

(86) PCT No.: PCT/KR2020/017600
§ 371 (c)(1),
(2) Date: May 26, 2022

(87) PCT Pub. No.: WO2021/112607
PCT Pub. Date: Jun. 10, 2021

(65) Prior Publication Data
US 2022/0416231 A1    Dec. 29, 2022

(30) Foreign Application Priority Data
Dec. 6, 2019 (KR) .................. 10-2019-0162032

(51) Int. Cl.
| | |
|---|---|
| *H01M 4/04* | (2006.01) |
| *C01G 53/00* | (2006.01) |
| *H01M 4/36* | (2006.01) |
| *H01M 4/505* | (2010.01) |
| *H01M 4/525* | (2010.01) |
| *H01M 4/02* | (2006.01) |

(52) U.S. Cl.
CPC ............ *H01M 4/366* (2013.01); *C01G 53/50* (2013.01); *H01M 4/0471* (2013.01); *H01M 4/505* (2013.01); *H01M 4/525* (2013.01); *C01P 2002/50* (2013.01); *C01P 2004/50* (2013.01); *C01P 2004/84* (2013.01); *C01P 2006/40* (2013.01); *H01M 2004/028* (2013.01)

(58) Field of Classification Search
CPC .................................. H01M 4/50; H01M 4/52
See application file for complete search history.

(56) References Cited

U.S. PATENT DOCUMENTS

| | | | |
|---|---|---|---|
| 2008/0090150 A1 | 4/2008 | Nakura | |
| 2009/0314984 A1* | 12/2009 | Sasaki | .......... C01G 53/42 252/182.1 |
| 2010/0221613 A1 | 9/2010 | Ueki et al. | |
| 2015/0243984 A1 | 8/2015 | Kase et al. | |
| 2016/0013476 A1* | 1/2016 | Oh | .......... H01M 4/1391 427/126.3 |
| 2017/0040601 A1* | 2/2017 | Nakayama | .......... H01M 4/525 |
| 2017/0207455 A1 | 7/2017 | Watanabe et al. | |
| 2018/0047975 A1* | 2/2018 | Zhu | .......... H01M 4/525 |
| 2018/0323431 A1 | 11/2018 | Kase et al. | |
| 2019/0067694 A1 | 2/2019 | Sun et al. | |
| 2020/0212442 A1 | 7/2020 | Watanabe et al. | |
| 2020/0358097 A1 | 11/2020 | Sun et al. | |
| 2021/0119201 A1 | 4/2021 | Okada et al. | |
| 2022/0190333 A1* | 6/2022 | Takamori | .......... H01M 4/366 |

FOREIGN PATENT DOCUMENTS

| | | |
|---|---|---|
| JP | 2006302880 A | 11/2006 |
| JP | 2017037766 A | 2/2017 |
| JP | 6094591 B2 | 3/2017 |
| JP | 2019506703 A | 3/2019 |
| KR | 20100007236 A | 1/2010 |
| KR | 20100056563 A | 5/2010 |
| KR | 20170124105 A | 11/2017 |
| KR | 101816945 B1 | 1/2018 |
| KR | 101884521 B1 | 8/2018 |
| WO | 2019189679 A1 | 10/2019 |

OTHER PUBLICATIONS

International Search Report for Application No. PCT/KR2020/017600 mailed Mar. 12, 2021, 2 pages.
Extended European Search Report including Written Opinion for Application No. 20895917.1 dated Dec. 8, 2022, pp. 1-7.

\* cited by examiner

*Primary Examiner* — Austin Murata
(74) *Attorney, Agent, or Firm* — Lerner David LLP (57) ABSTRACT

A method of producing a positive electrode material for a secondary battery includes preparing a lithium composite transition metal oxide containing nickel, cobalt, and manganese, forming a coating layer on a surface of the lithium composite transition metal oxide, and post-treating the lithium composite transition metal oxide having the coating layer formed thereon, wherein the post-treating is performed by exposing the lithium composite transition metal oxide having the coating layer formed thereon to moisture at a relative humidity of 10% to 50% at 25° C., and then heat treating the lithium composite transition metal oxide to remove residual moisture.

9 Claims, 4 Drawing Sheets

METHOD OF PRODUCING POSITIVE ELECTRODE MATERIAL FOR SECONDARY BATTERY

CROSS-REFERENCE TO RELATED APPLICATIONS

This application is a national phase entry under 35 U.S.C. § 371 of International Application No. PCT/KR2020/017600, filed on Dec. 4, 2020, which claims the benefit of Korean Patent Application No. 10-2019-0162032, filed on Dec. 6, 2019, in the Korean Intellectual Property Office, the disclosures of which are incorporated herein in its entirety by reference.

TECHNICAL FIELD

The present invention relates to a method of producing a positive electrode material for a secondary battery.

Background Art

The rapid popularization of battery powered electronics such as mobile phones, notebook computers, and electric vehicles has brought with it a rapidly rising demand for small, lightweight and relatively higher capacity secondary batteries lately. Lithium secondary batteries in particular are highlighted as a driving power source for portable electronics because they are lightweight and have a high energy density. Accordingly, there have been extensive research and development efforts to improve the performance of lithium secondary batteries.

Lithium secondary batteries produce electric energy through an oxidation-reduction reaction occurring when lithium ions are intercalated/deintercalated into/from negative electrodes and positive electrodes, both of which are made of an active material enabling intercalation and deintercalation of lithium ions, in a state in which an organic electrolyte solution or a polymer electrolyte solution is filled between the negative electrodes and the positive electrodes. lithium cobalt oxide ($LiCoO_2$), lithium nickel oxide ($LiNiO_2$), lithium manganese oxide ($LiMnO_2$, $LiMn_2O_4$, etc.), lithium iron phosphate compound ($LiFePO_4$), etc. have been used as a positive electrode active material for lithium secondary batteries. Among these materials, lithium cobalt oxide ($LiCoO_2$) has a high operating voltage and excellent capacity characteristics, and thus is widely used, and is applied as a positive electrode active material for high voltage. However, since there is a limitation in using a large amount of $LiCoO_2$ as a power source for applications, such as electric vehicles, due to the rising price and unstable supply of cobalt (Co), there has emerged a need to develop a positive electrode active material capable of replacing $LiCoO_2$.

Accordingly, a nickel cobalt manganese-based lithium composite transition metal oxide (hereinafter, simply referred to as 'NCM-based lithium composite transition metal oxide'), in which a portion of cobalt (Co) is substituted with nickel (Ni) and manganese (Mn), has been developed. In an effort to address issues such as electrolyte decomposition and surface resistance increase, which may be caused when the NCM-based lithium composite transition metal oxide comes into contact with the electrolyte, surface coating of the NCM-based lithium composite transition metal oxide has been introduced. However, when the NCM-based lithium composite transition metal oxide is in the form of a secondary particle formed by aggregation of primary particles, there is a deterioration in the performance of a battery due to the fact that during electrode rolling, the secondary particle is broken and an uncoated portion is exposed, leading to side reactions with the electrolyte. In this regard, there remains a need to develop a technology capable of minimizing the battery performance deterioration resulting from the particle breakage while keeping the present level of rolling for improving electrode energy density.

DISCLOSURE OF THE INVENTION

Technical Problem

The present invention provides, in a positive electrode material of an NCM-based lithium composite transition metal oxide, a method of producing a positive electrode material for a secondary battery capable of reducing side reactions with an electrolyte, which are caused when an uncoated portion is exposed inside due to particle breakage during rolling, and reducing deterioration in the performance of a battery therefrom by introducing a coating layer formed on the surface of a secondary particle into the inside of the secondary particle through post-treating.

Technical Solution

The present invention provides a method of producing a positive electrode material for a secondary battery, the method including preparing a lithium composite transition metal oxide containing nickel, cobalt, and manganese, forming a coating layer on the surface of the lithium composite transition metal oxide, and post-treating the lithium composite transition metal oxide having the coating layer formed thereon, wherein the post-treating is performed by exposing the lithium composite transition metal oxide having the coating layer formed thereon to moisture at a relative humidity of 10% to 50% at 25° C., and then heat treating the lithium composite transition metal oxide to remove residual moisture.

Advantageous Effects

According to the present invention, a coating layer formed on the surface of a secondary particle of an NCM-based lithium composite transition metal oxide may penetrate into the inside of the secondary particle through post-treating. Accordingly, the coating treatment is allowed even to the surfaces of primary particles inside the second particle, and thus, even when particle breakage occurs during rolling, the coated surfaces of the primary particles are exposed, which may reduce side reactions with an electrolyte, caused when an uncoated portion is exposed inside, and reduce deterioration in the performance of a battery therefrom.

MODE FOR CARRYING OUT THE INVENTION

Hereinafter, the present invention will be described in detail to aid in understanding of the present invention. Here, it will be understood that words or terms used in the specification and claims of the present invention shall not be construed as being limited to having the meaning defined in commonly used dictionaries. It will be further understood that the words or terms should be interpreted as having meanings that are consistent with their meanings in the context of the relevant art and the technical idea of the invention, based on the principle that an inventor may properly define the meaning of the words or terms to best explain the invention.

<Method of Producing Positive Electrode Active Material>

The present invention provides a method of producing a positive electrode material for a secondary battery, the method including preparing a lithium composite transition metal oxide containing nickel, cobalt, and manganese, forming a coating layer on the surface of the lithium composite transition metal oxide, and post-treating the lithium composite transition metal oxide having the coating layer formed thereon, and the post-treating is performed by exposing the lithium composite transition metal oxide having the coating layer formed thereon to moisture at a relative humidity of 10% to 50% at 25° C., and then heat treating the lithium composite transition metal oxide to remove residual moisture.

The method of producing a positive electrode material will be described in detail step by step.

First, a lithium composite transition metal oxide containing nickel, cobalt, and manganese is prepared.

The lithium composite transition metal oxide is an NCM-based lithium composite transition metal oxide containing nickel (Ni), cobalt (Co), and manganese (Mn). The lithium composite transition metal oxide may more preferably be a high-Ni NCM-based lithium composite transition metal oxide in which nickel (Ni) is contained in an amount of 50 mol % or more with respect to the total metal amount excluding lithium (Li). More preferably, nickel (Ni) may be contained in an amount of 60 mol % or more, and more preferably 80 mol % or more. When the amount of nickel (Ni) satisfies the range of 50 mol % or more of the total metal content of the lithium composite transition metal oxide excluding lithium (Li), higher capacity may be achieved.

The lithium transition metal oxide may be represented by Formula 1 below.

$Li_aNi_{1-b-c-d}Co_bMn_cQ_dO_{2+\delta}$ [Formula 1]

In Formula 1 above, Q is at least one element selected from the group consisting of Al, B, W, Mg, V, Ti, Zn, Ga, In, Ru, Nb, Sn, Sr, and Zr, and $1.0 \leq a \leq 1.5$, $0 < b \leq 0.5$, $0 < c \leq 0.5$, $0 \leq d \leq 0.1$, $0 < b+c+d \leq 0.5$, and $-0.1 \leq \delta \leq 1.0$.

In the lithium composite transition metal oxide of Formula 1 above, Li may be contained in an amount (molar ratio) corresponding to a, that is, $1.0 \leq a \leq 1.5$. When a is less than 1.0, the capacity may be reduced, and when a is greater than 1.5, particles are sintered in the process of firing, which may thus lead to failure in producing a positive electrode active material. Given the significant improvement in capacity characteristics of the positive electrode active material according to the Li amount control, and balance in sintering for producing an active material, Li may be more preferably contained in an amount of $1.0 \leq a \leq 1.2$.

In the lithium composite transition metal oxide of Formula 1 above, Ni may be contained in an amount (molar ratio) corresponding to $1-(b+c+d)$, for example, $0.5 \leq 1-(b+c+d) < 1$. When the amount of Ni in the lithium composite transition metal oxide of Formula 1 above is 0.5 or more, a sufficient amount of Ni to contribute to charging/discharging is secured, which may thus lead to high capacity. More preferably, Ni may be contained in an amount of $0.60 \leq 1-(b+c+d) \leq 0.99$.

In the lithium composite transition metal oxide of Formula 1 above, Co may be contained in an amount (molar ratio) corresponding to b, that is, $0 < b \leq 0.5$. When the amount of Co in the lithium composite transition metal oxide of Formula 1 above exceeds 0.5, there is a concern of cost increase. Given the significant improvement in capacity characteristics due to the inclusion of Co, Co may be more specifically contained in an amount of $0.05 \leq b \leq 0.2$.

In the lithium composite transition metal oxide of Formula 1 above, Mn may be contained in an amount (molar ratio) corresponding to c, that is, $0 < c \leq 0.5$. When c in the lithium composite transition metal oxide of Formula 1 above exceeds 0.5, there is a concern that the output characteristics and capacity characteristics of a battery may be deteriorated, and Mn may be more specifically contained in an amount of $0.05 \leq c \leq 0.2$.

In the lithium composite transition metal oxide of Formula 1 above, Q may be a doping element included in the crystal structure of the lithium composite transition metal oxide, and Q may be contained in an amount (molar ratio) corresponding to d, that is, $0 \leq d \leq 0.1$.

The lithium composite transition metal oxide may be a secondary particle formed by aggregation of primary particles. In the present invention, a 'primary particle' refers to a smallest particle unit that is distinguished as being one mass when a cross-section of a positive electrode active material is observed through a scanning electron microscope (SEM), and may be made of a single crystal grain, or a plurality of crystal grains. In the present invention, an average particle diameter of the primary particle may be measured by a method for measuring the size of each particle distinguished in a cross-sectional SEM image of the positive electrode active material particle.

In the present invention, a 'secondary particle' refers to a secondary structural body formed by aggregation of a plurality of primary particles. An average particle diameter of the secondary particle may be measured using a particle size analyzer, and in the present invention, s3500 from Microtrac Co., Ltd. was used as a particle size analyzer.

Next, a coating layer is formed on the surface of the lithium composite transition metal oxide.

A method of forming the coating layer is not particularly limited, and a conventional coating treatment method of a positive electrode material for a secondary battery may be applied. For example, the lithium composite transition metal oxide and a coating source may be mixed and then heat treated to form a coating layer on the surface. The coating source, for example, may be at least one selected from the group consisting of $Al(OH)_3$, $Al_2O_3$, $H_3BO_3$, $B_2O_3$, $TiO_2$, $TiO$, $Ti_2O_3$, $Ti_3O$, $Ti_2O$, $Zr(OH)_4$, $ZrO_2$, $ZnO_2$, $Mg(OH)_2$, $MgO$, $H_2WO_4$, $WO_3$, $VO$, $VO_2$, $V_2O_3$, $V_2O_5$, $Ga_2O$, $Ga_2O_3$, $In_2O_3$, $RuO_2$, $RUO_4$, $NbO$, $Nb_2$, $Nb_2O_5$, $SnO$, $SnO_2$, $Sr(OH)_2$, and $SrO$. After mixing the coating source, heat treating may be performed in an air atmosphere, and may be performed at 100° C. to 600° C., more preferably at 100° C. to 500° C. for 1 to 10 hours.

The coating layer formed as described above contains a lithium metal oxide including at least one element selected from the group consisting of Al, B, W, Mg, V, Ti, Zn, Ga, In, Ru, Nb, Sn, Sr, and Zr. Specifically, the coating layer may contain lithium by-products remaining on the surface of the lithium composite transition metal oxide, for example, a lithium metal oxide formed through a reaction between LiOH and/or $Li_2CO_3$ and the coating source. More preferably, the coating layer may contain a lithium metal oxide including at least one selected from the group consisting of Al, B, and W. In this case, the lithium metal oxide may be a water soluble compound. When the coating layer contains the water soluble compounds, the coating compound contained in the coating layer formed on the surface of the secondary particle may effectively penetrate into the secondary particle through post-treating.

Next, the lithium composite transition metal oxide having the coating layer formed thereon is post-treated. In this case, the post-treating is performed by exposing the lithium composite transition metal oxide having the coating layer formed thereon to moisture at a relative humidity of 10% to 50% at 25° C., and then heat treating the lithium composite transition metal oxide to remove residual moisture.

The water soluble lithium metal oxide contained in the coating layer may be dissolved in water, and may penetrate from the surface of the secondary particle to the inside thereof through exposure to moisture in the post-treating. During the post-treating, the relative humidity may be, at 25° C., 10% to 50%, more preferably 10% to 40%, and even more preferably 10% to 30%. When the relative humidity satisfies the above range, the coating layer may be evenly formed on the surface and inside of the lithium composite transition metal oxide. When the relative humidity is less than 10%, the coating compound can hardly penetrate into the inside of the secondary particle, so that the coating is poorly formed on the surfaces of the primary particles, and when the relative humidity exceeds 50%, the coating compound over-penetrates into the inside of the secondary particle, so that the coating layer is not evenly formed on the surface of the secondary particle, which may cause side reactions with an electrolyte on the surface of the secondary particle.

Moisture exposure in the above relative humidity range may be performed for 1 to 240 hours, more preferably 24 to 240 hours, more preferably 24 to 168 hours. When the moisture exposure is performed in the above relative humidity range, for the above period of time, the coating compound contained in the coating layer formed on the surface of the secondary particle is dissolved in the surface-adsorbed moisture and effectively penetrates into the inside of the secondary particle, so that the coating compound may coat the surfaces of the primary particles.

After the moisture exposure, the lithium composite transition metal oxide is heat treated to remove residual moisture. The heat treating may be performed at 100° C. to 500° C., more preferably 200° C. to 400° C., more preferably 300° C. to 400° C. The heat treating may be performed in an air atmosphere, and may be performed for 1 to 10 hours, more preferably for 4 to 6 hours.

Through such post-treating, the coating compound contained in the coating layer formed on the surface of the lithium composite transition metal oxide may be distributed to the surfaces of the primary particles inside the secondary particle. Accordingly, even when particle breakage occurs during rolling, the coated surfaces of the primary particles are exposed, which may reduce side reactions with an electrolyte, caused when an uncoated portion is exposed inside, and reduce deterioration in the performance of a battery therefrom.

<Positive Electrode and Lithium Secondary Battery>

According to another embodiment of the present invention, provided are a positive electrode for a secondary battery including the positive electrode material produced as described above, and a lithium secondary battery.

Specifically, the positive electrode includes a positive electrode current collector, and a positive electrode material layer formed on the positive electrode current collector and including the positive electrode material.

In the positive electrode, the positive electrode current collector is not particularly limited as long as it has conductivity without causing a chemical change in a battery. For example, stainless steel, aluminum, nickel, titanium, firing carbon, or aluminum or stainless steel that is surface-treated with one of carbon, nickel, titanium, silver, and the like may be used. In addition, the positive electrode current collector may typically have a thickness of 3 to 500 μm, and fine irregularities may be formed on a surface of the current collector to improve the adhesion of a positive electrode material. For example, the positive electrode current collector may be used in various forms such as a film, a sheet, a foil, a net, a porous body, a foam body, and a non-woven fabric body.

In addition, the positive electrode material layer may include a conductive material and a binder, together with the positive electrode material described above.

In this case, the conductive material is used to impart conductivity to an electrode, and any conductive material may be used without particular limitation as long as it has electron conductivity without causing a chemical change in a battery to be constituted. Specific examples thereof may include graphite such as natural graphite or artificial graphite; a carbon-based material such as carbon black, acetylene black, Ketjen black, channel black, furnace black, lamp black, thermal black, and carbon fiber; metal powder or metal fiber such as copper, nickel, aluminum, and silver; a conductive whisker such as a zinc oxide whisker and a potassium titanate whisker; a conductive metal oxide such as a titanium oxide; or a conductive polymer such as a polyphenylene derivative, and any one thereof or a mixture of two or more thereof may be used. The conductive material may typically be included in an amount of 1 wt % to 30 wt % with respect to the total weight of the positive electrode material layer.

In addition, the binder serves to improve the bonding between positive electrode material particles and the adhesion between the positive electrode material and the positive electrode current collector. Specific examples thereof may include polyvinylidene fluoride (PVDF), a polyvinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, polytetrafluoroethylene, polyethylene, polypropylene, ethylene-propylene-diene monomer rubber(EPDM rubber), a sulfonated EPDM, styrene-butadiene rubber (SBR), fluorine rubber, or various copolymers thereof, and any one thereof or a mixture of two or more thereof may be used. The binder may be included in an amount of 1 wt % to 30 wt % with respect to the total weight of the positive electrode material layer.

The positive electrode may be prepared according to a typical method of preparing a positive electrode except that the positive electrode material described above is used. Specifically, a composition for forming a positive electrode material layer including the positive electrode material and selectively, a binder and a conductive material is applied onto the positive electrode current collector, and the positive electrode may then be prepared by drying and rolling the coated positive electrode current collector. In this case, types and amounts of the positive electrode material, the binder, and the conductive material are as described above.

The solvent may be a solvent commonly used in the art, and may be dimethyl sulfoxide (DMSO), isopropyl alcohol, N-methylpyrrolidone (NMP), acetone, water, or the like, and any one thereof or a mixture of two or more thereof may be used. The amount of the solvent to be used is sufficient if the solvent may dissolve or disperse the positive electrode material, the conductive material, and the binder in consideration of the applying thickness of a slurry and preparation yield, and thereafter, have a viscosity which may exhibit excellent thickness uniformity during application for the preparation of a positive electrode.

In addition, in another method, the positive electrode may be prepared by casting a composition for forming a positive electrode material layer on a separate support and then laminating a film separated from the support on the positive electrode current collector.

According to another embodiment of the present invention, an electrochemical device including the positive electrode is provided. The electrochemical device may be specifically a battery, a capacitor, or the like, and more specifically, may be a lithium secondary battery.

Specifically, the lithium secondary battery includes a positive electrode, a negative electrode positioned to face the positive electrode, a separator interposed between the positive electrode and the negative electrode, and an electrolyte, and the positive electrode is the same as that described above. In addition, the lithium secondary battery may selectively further include a battery case for accommodating an electrode assembly composed of the positive electrode, the negative electrode, and the separator, and a sealing member for sealing the battery case.

In the lithium secondary battery, the negative electrode includes a negative electrode current collector and a negative electrode active material layer positioned on the negative electrode current collector.

The negative electrode current collector is not particularly limited as long as it has a high conductivity without causing a chemical change in a battery. For example, copper, stainless steel, aluminum, nickel, titanium, firing carbon, copper or stainless steel that is surface-treated with one of carbon, nickel, titanium, silver, and the like, an aluminum-cadmium alloy, and the like may be used. Also, the negative electrode current collector may typically have a thickness of 3 to 500 µm, and as in the case of the positive electrode current collector, fine irregularities may be formed on the surface of the negative electrode current collector to improve the adhesion of a negative electrode active material. For example, the negative electrode current collector may be used in various forms such as a film, a sheet, a foil, a net, a porous body, a foam body, and a non-woven fabric body.

The negative electrode active material layer selectively includes a binder and a conductive material in addition to a negative electrode active material. The negative electrode active material layer may be prepared by, for example, applying a composition for forming a negative electrode including a negative electrode active material, and selectively a binder and a conductive material on a negative electrode current collector, and then drying the negative electrode current collector, or the negative electrode active material layer may be prepared by casting the composition for forming a negative electrode on a separate support, and then laminating a film separated from the support on the negative electrode current collector.

A compound capable of reversibly intercalating and deintercalating lithium may be used as the negative electrode active material. Specific examples of the negative electrode active material may be a carbonaceous material such as artificial graphite, natural graphite, graphitized carbon fibers, and amorphous carbon; a metallic compound alloyable with lithium such as silicon (Si), aluminum (Al), tin (Sn), lead (Pb), zinc (Zn), bismuth (Bi), indium (In), magnesium (Mg), gallium (Ga), cadmium (Cd), a Si alloy, a Sn alloy, or an Al alloy; a metal oxide which may be doped and undoped with lithium such as $SiO_\beta$ ($0<\beta<2$), $SnO_2$, vanadium oxide, and lithium vanadium oxide; or a composite including the metallic compound and the carbonaceous material such as a Si—C composite or a Sn—C composite, and any one thereof or a mixture of two or more thereof may be used. Also, a metal lithium thin film may be used as the negative electrode active material. Furthermore, low crystalline carbon, high crystalline carbon and the like may all be used as a carbon material. Typical examples of the low crystalline carbon may include soft carbon and hard carbon, and typical examples of the high crystalline carbon may include irregular, planar, flaky, spherical, or fibrous natural graphite or artificial graphite, Kish graphite, pyrolytic carbon, mesophase pitch-based carbon fiber, meso-carbon microbeads, mesophase pitches, and high-temperature sintered carbon such as petroleum or coal tar pitch derived cokes.

In addition, the binder and the conductive material may be the same as described above for the positive electrode.

Meanwhile, in the lithium secondary battery, a separator is to separate the negative electrode and the positive electrode and to provide a movement path for lithium ions. Any separator may be used without particular limitation as long as it is typically used as a separator in a lithium secondary battery. Particularly, a separator having high moisture-retention ability for an electrolyte as well as low resistance to the movement of electrolyte ions is preferable. Specifically, a porous polymer film, for example, a porous polymer film manufactured using a polyolefin-based polymer such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous non-woven fabric, for example, a non-woven fabric formed of glass fiber having a high melting point, polyethylene terephthalate fiber, or the like may be used. Also, a coated separator including a ceramic component or a polymer material may be used to secure heat resistance or mechanical strength, and may be selectively used in a single-layered or a multi-layered structure.

In addition, the electrolyte used in the present invention may be an organic liquid electrolyte, an inorganic liquid electrolyte, a solid polymer electrolyte, a gel-type polymer electrolyte, a solid inorganic electrolyte, a molten-type inorganic electrolyte, and the like, all of which may be used in the manufacturing of a lithium secondary battery, but is not limited thereto.

Specifically, the electrolyte may include an organic solvent and a lithium salt.

Any organic solvent may be used without particular limitation as long as it may serve as a medium through which ions involved in an electrochemical reaction of a battery may move. Specifically, as the organic solvent, an ester-based solvent such as methyl acetate, ethyl acetate, γ-butyrolactone, and ε-caprolactone; an ether-based solvent such as dibutyl ether or tetrahydrofuran; a ketone-based solvent such as cyclohexanone; an aromatic hydrocarbon-based solvent such as benzene and fluorobenzene; a carbonate-based solvent such as dimethyl carbonate (DMC), diethyl carbonate (DEC), ethylmethyl carbonate (EMC), ethylene carbonate (EC), and propylene carbonate (PC); an alcohol-based solvent such as ethyl alcohol and isopropyl alcohol; nitriles such as R-CN (where R is a linear, branched, or cyclic C2 to C20 hydrocarbon group and may include an aromatic ring with double-bond, or ether bond); amides such as dimethylformamide; dioxolanes such as 1,3-dioxolane; or sulfolanes may be used. Among these solvents, a carbonate-based solvent is preferable, and a mixture of a cyclic carbonate (e.g., ethylene carbonate or propylene carbonate) having a high ionic conductivity and a high dielectric constant and a linear carbonate-based compound having a low viscosity (e.g., ethylmethyl carbonate, dimethyl carbonate, or diethyl carbonate), the mixture which may increase charging/discharging performance of a battery, is more preferable.

Any compound may be used as the lithium salt without particular limitation as long as it may provide lithium ions used in a lithium secondary battery. Specifically, as the lithium salt, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, $LiCl$, $LiI$, $LiB(C_2O_4)_2$, or the like may be used. The lithium salt may be used in a concentration range of 0.1 M to 2.0 M. When the concentration of the lithium salt is in the above range, the electrolyte has suitable conductivity and viscosity, thereby exhibiting excellent performance, and lithium ions may effectively move.

In the electrolyte, in order to improve the lifespan properties of a battery, suppress the decrease in battery capacity, and improve the discharge capacity of the battery, one or more kinds of additives, for example, a halo-alkylene carbonate-based compound such as difluoroethylene carbonate, pyridine, triethylphosphite, triethanolamine, cyclic ether, ethylenediamine, n-glyme, hexamethylphosphoric acid triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride, and the like may be further included. In this case, the additive may be included in an amount of 0.1 wt % to 5 wt % with respect to a total weight of the electrolyte.

The lithium secondary battery including the positive electrode material according to the present invention as describe above stably exhibits excellent discharging capacity, output properties, and capacity retention, and thus, are useful for portable devices such as a mobile phone, a notebook computer, and a digital camera, and in the field of electric cars such as a hybrid electric vehicle (HEV).

Accordingly, according to another embodiment of the present invention, a battery module including the lithium secondary battery as a unit cell, and a battery pack including the same are provided.

The battery module or the battery pack may be used as a power source of one or more medium-and-large-sized devices, for example, a power tool, an electric car such as an electric vehicle (EV), a hybrid electric vehicle (HEV), and a plug-in hybrid electric vehicle (PHEV), or a power storage system.

MODE FOR CARRYING OUT THE INVENTION

Hereinafter, embodiments of the present invention will be described in detail to make sure that those skilled in the art easily implement the present invention. However, the present invention may be modified into other various forms, and is not limited to the embodiments described herein.

EXAMPLE 1

A coating source, $H_3BO_3$ was mixed with a lithium composite transition metal oxide, $LiNi_{0.7}Co_{0.1}Mn_{0.2}O_2$, and the mixture was heat treated at 400° C. for 5 hours in an air atmosphere to form a coating layer on the surface.

The lithium composite transition metal oxide having the coating layer formed thereon was put into a chamber at a relative humidity of 30% at 25° C., and exposed to moisture for 48 hours. Then, the resultant was heat treated at 400° C. for 5 hours to remove residual moisture, thereby obtaining a post-treated positive electrode material.

COMPARATIVE EXAMPLE 1

A coating source, $H_3BO_3$ was mixed with a lithium composite transition metal oxide, $LiNi_{0.7}Co_{0.1}Mn_{0.2}O_2$, and the mixture was heat treated at 400° C. for 5 hours in an air atmosphere to produce a positive electrode material having the coating layer formed on the surface. Thereafter, no post-treatment was performed.

COMPARATIVE EXAMPLE 2

A post-treated positive electrode material was produced in the same manner as in Example 1, except that the lithium composite transition metal oxide having the coating layer formed thereon was put into a chamber at a relative humidity of 5% at 25° C.

COMPARATIVE EXAMPLE 3

A post-treated positive electrode material was produced in the same manner as in Example 1, except that the lithium composite transition metal oxide having the coating layer formed thereon was put into a chamber at a relative humidity of 60% at 25° C.

EXPERIMENTAL EXAMPLE 1

Composition Analysis of Cross Section of Positive Electrode Material

Positive electrode materials produced in Example 1 and Comparative Examples 1 to 3 were treated with FIB (Focused Ion Beam), and NANO-SIMS analysis thereof was conducted to analyze composition of cross sections, and accordingly, the composition of coating penetrated into a secondary particle was observed. The results are shown in FIGS. 1 and 4.

Figure 1:
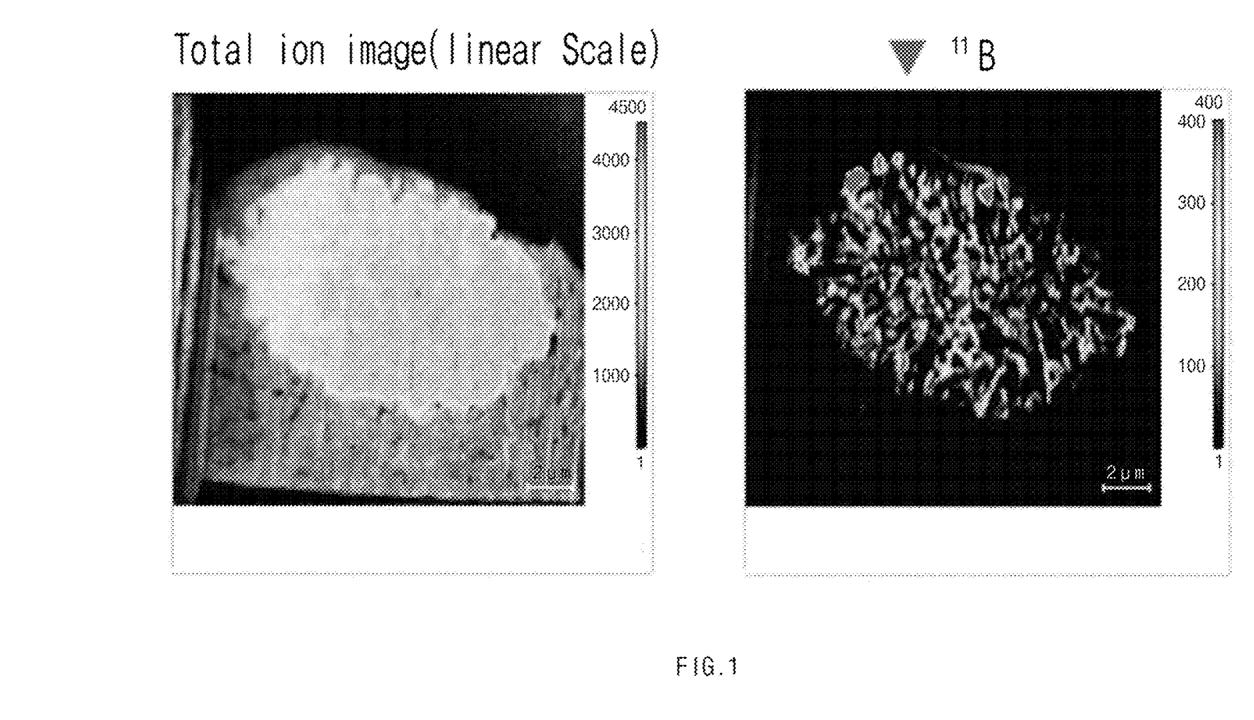
FIG. 1 is a composition analysis image of a cross section of a positive electrode material produced according to Example 1.

FIG. 1 is a composition analysis image of a cross section of the positive electrode material according to Example 1, which shows that in the post-treated positive electrode material according to the present invention, a coating element $^{11}B$ was evenly distributed to the inside of the secondary particle.

Figure 2:
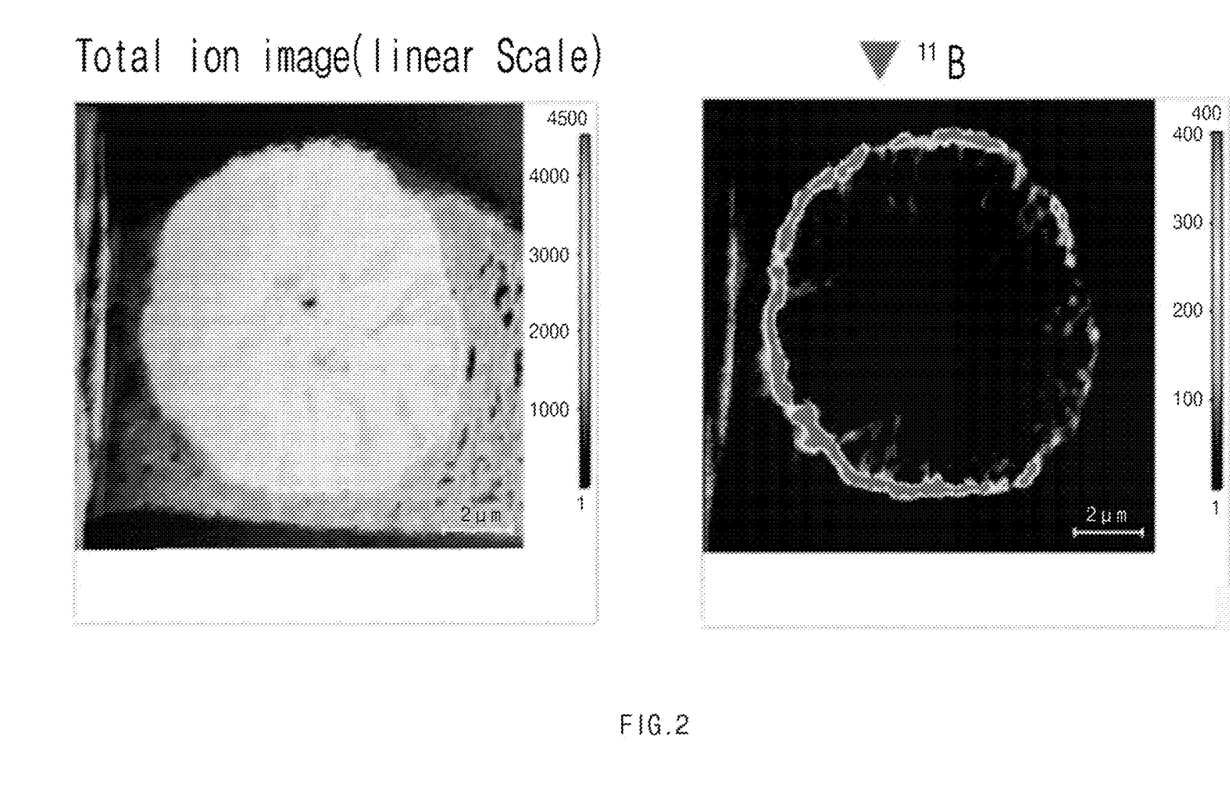
FIG. 2 is a composition analysis image of a cross section of a positive electrode material produced according to Comparative Example 1.

In contrast, FIG. 2 is a composition analysis image of a cross section of the positive electrode material according to Comparative Example 1, which shows that in the non-posttreated positive electrode material, a coating element $^{11}$B was distributed only on the surface of the secondary particle.

Figure 3:
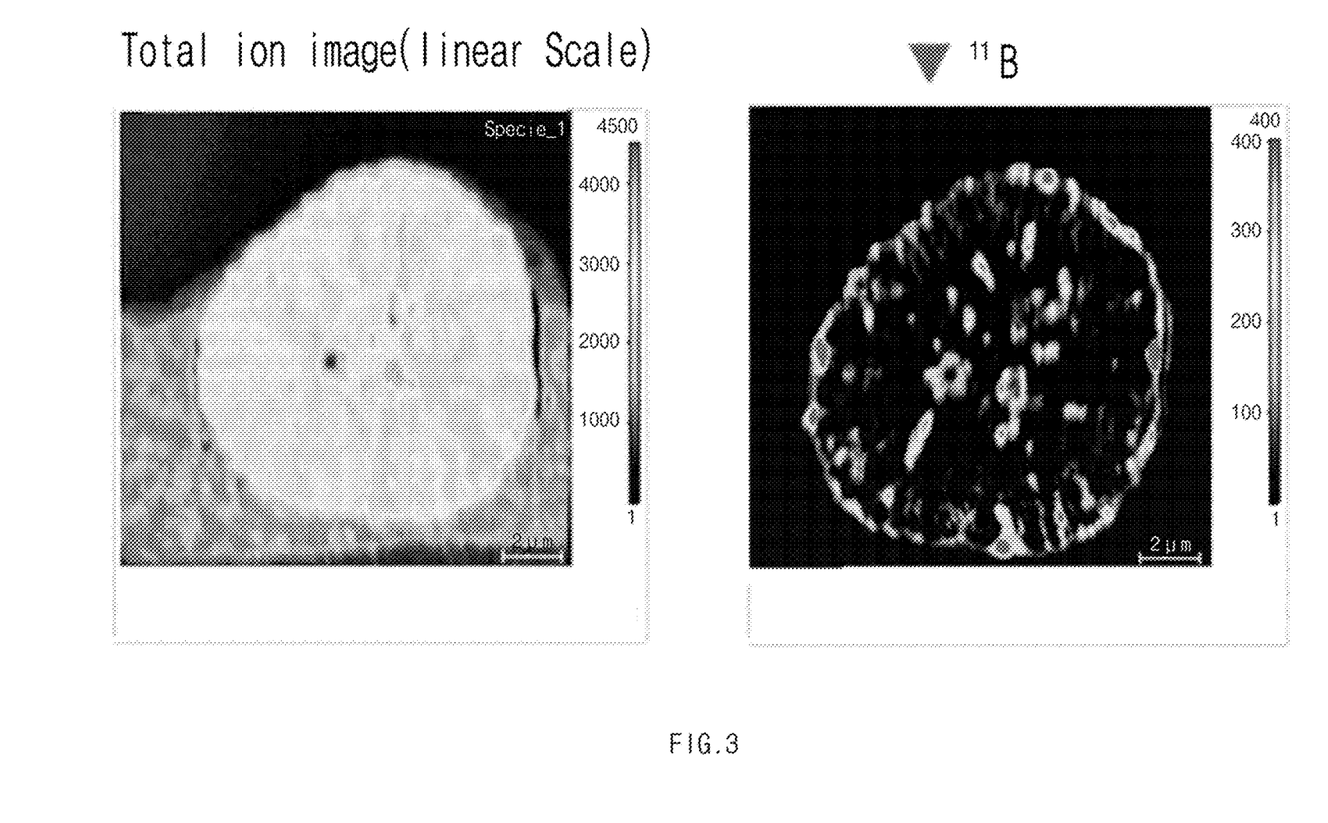
FIG. 3 is a composition analysis image of a cross section of a positive electrode material produced according to Comparative Example 2.
Figure 4:
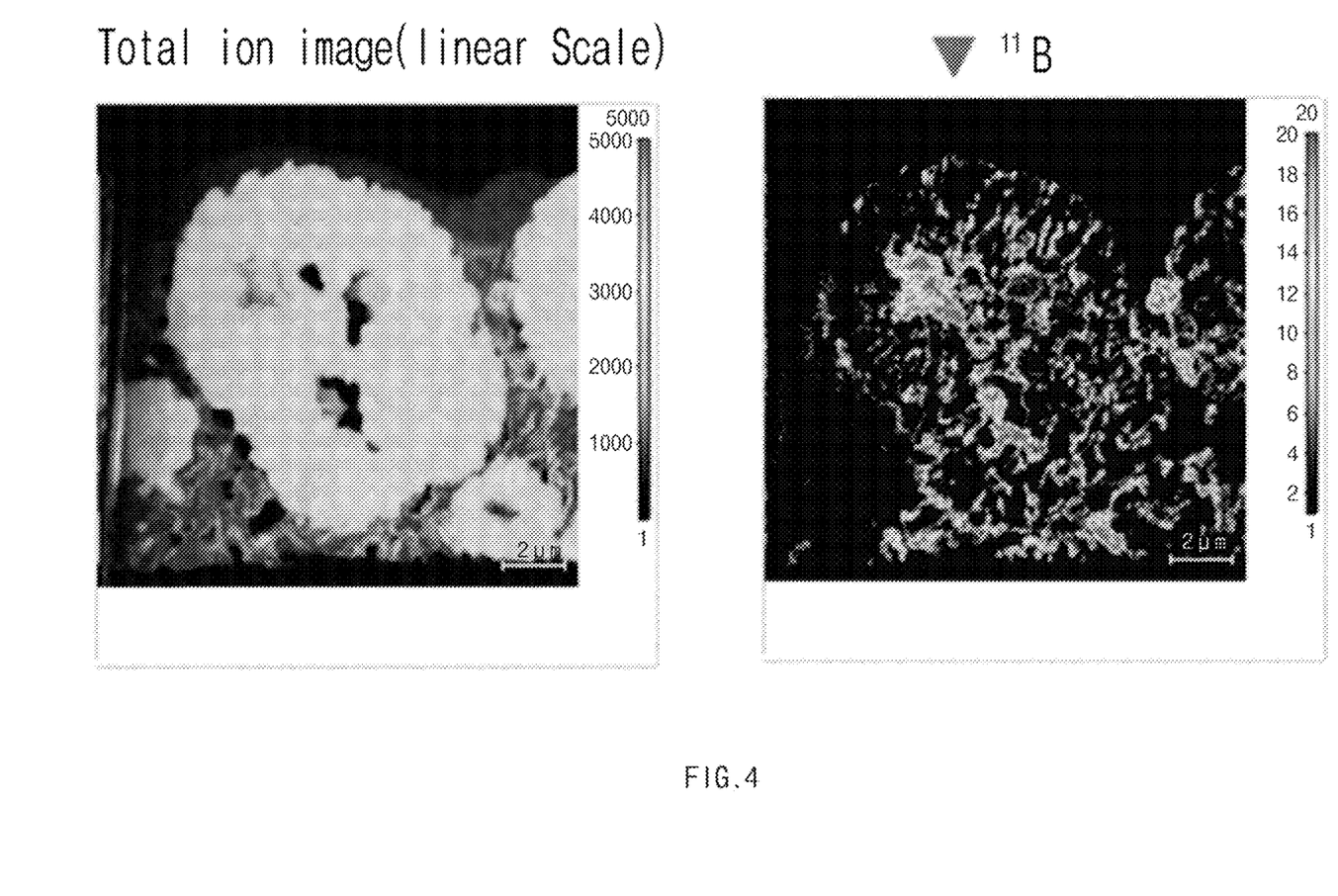
FIG. 4 is a composition analysis image of a cross section of a positive electrode material produced according to Comparative Example 3.

FIG. 3 is a composition analysis image of a cross section of the positive electrode material according to Comparative Example 2, which shows that when post-treating was performed at a relative humidity of less than 10%, the coating element $^{11}$B was mainly present on the surface of the particle, and only a small amount of the coating element $^{11}$B penetrated into the particle and thus, the coating was not evenly formed inside the particle.

FIG. 4 is a composition analysis image of a cross section of the positive electrode material according to Comparative Example 3, which shows that when post-treating was performed at a relative humidity of greater than 50%, the coating element $^{11}$B over-penetrated into the inside of the particle, thus being included in a large amount inside the particle, but was not evenly applied onto both the inside and the surface of the particle and was distributed unevenly.

EXPERIMENTAL EXAMPLE 2

High-Temperature Storage Evaluation

Each of the positive electrode materials produced in Example 1 and Comparative Examples 1 to 3, a carbon black conductive material, and a PVdF binder were mixed in an N-methylpyrrolidone solvent at a weight ratio of 96:2:2 to prepare a positive electrode material mixture, and the mixture was applied onto one surface of an aluminum current collector, dried at 100° C., and then rolled to prepare a positive electrode.

Artificial graphite, a carbon black conductive material, and a PVdF binder were mixed in an N-methylpyrrolidone solvent at a weight ratio of 96:2:2 to prepare a negative electrode material mixture, and the mixture was applied onto one surface of a copper current collector, dried at 120° C., and then rolled to prepare a positive electrode.

A porous polyethylene separator was interposed between the positive electrode and the negative electrode prepared above to produce an electrode assembly, and the electrode assembly was placed inside a battery case. Thereafter, an electrolyte solution was injected into the inside of the case to produce a lithium secondary battery. In this case, the electrolyte solution was prepared by dissolving 1.0 M of lithium hexafluorophosphate (LiPF$_6$) in an organic solvent in which ethylene carbonate(EC), ethyl methyl carbonate (EMC), and diethyl carbonate (DEC) were mixed in a volume ratio of 3:4:3.

Each full-cell lithium secondary battery produced as described above was charged up to 4.2 V with 0.7 C at 25° C. in CCCV mode (end current: 1/20 C), and was stored at high temperature of 60° C. for 4 weeks, and was subjected to charging/discharging in the range of 4.2 V to 3.0 V with a constant current of 0.5 C to measure capacity retention rates and resistance change rates. The results are shown in Table 1.

TABLE 1

| | Capacity retention rate (%) | Resistance change rate (%) |
|---|---|---|
| Example 1 | 92.5 | 160.5 |
| Comparative Example 1 | 87.3 | 190.1 |
| Comparative Example 2 | 85.2 | 187.5 |

TABLE 1-continued

| | Capacity retention rate (%) | Resistance change rate (%) |
|---|---|---|
| Comparative Example 3 | 75.4 | 231.5 |

Referring to Table 1, it is confirmed that Example 1 in which the post-treating of the present invention was performed had significantly improved capacity retention rate and reduced resistance change rate as compared to Comparative Example 1 in which the post-treating was not performed, or Comparative Examples 2 and 3 having too low or high relative humidity at the time of post-treating.

The invention claimed is:

1. A method of producing a positive electrode material for a secondary battery, the method comprising:
preparing a lithium composite transition metal oxide containing nickel, cobalt, and manganese;
forming a coating layer on a surface of the lithium composite transition metal oxide; and
subsequently post-treating the lithium composite transition metal oxide having the coating layer formed thereon,
wherein, the post-treating is performed by exposing the lithium composite transition metal oxide having the coating layer formed thereon to moisture at a relative humidity of 10% to 50% at 25° C., and then heat treating at 100° C. to 500° C. to remove residual moisture,
wherein the lithium composite transition metal oxide is a secondary particle in which primary particles are aggregated, and
wherein the coating layer is distributed to surfaces of the primary particles inside the secondary particle through the post-treating.

2. The method of claim 1, wherein the coating layer contains a lithium metal oxide including at least one element selected from the group consisting of Al, B, W, Mg, V, Ti, Zn, Ga, In, Ru, Nb, Sn, Sr, and Zr.

3. The method of claim 2, wherein the lithium metal oxide is a water soluble compound.

4. The method of claim 3, wherein the coating layer contains a lithium metal oxide including at least one selected from the group consisting of Al, B, and W.

5. The method of claim 1, wherein the post-treating is performed by exposing the lithium composite transition metal oxide having the coating layer formed thereon to moisture at a relative humidity of 10% to 30% at 25° C.

6. The method of claim 1, wherein the post-treating is performed by exposing the lithium composite transition metal oxide having the coating layer formed thereon to moisture for 1 to 240 hours.

7. The method of claim 1, wherein the heat treating to remove the residual moisture is performed for 1 to 10 hours.

8. The method of claim 1, wherein the lithium composite transition metal oxide is represented Formula 1 below:

$$Li_aNi_{1-b-c-d}Co_bMn_cQ_dO_{2+\delta}$$ [Formula 1]

wherein in Formula 1 above, Q is at least one element selected from the group consisting of Al, B, W, Mg, V, Ti, Zn, Ga, In, Ru, Nb, Sn, Sr, and Zr, and $1.0 \leq a \leq 1.5$, $0 < b < 0.5$, $0 < c < 0.5$, $0 \leq d \leq 0.1$, $0 < b+c+d \leq 0.5$, and $-0.1 \leq \delta \leq 1.0$.

9. The method of claim 1, wherein the lithium composite transition metal oxide is a secondary particle in which primary particles are aggregated; and wherein both the secondary particle and the primary particles have coating layers after the post-treating.

\* \* \* \* \*